(No Model.) 2 Sheets—Sheet 1.
R. C. TUCKER.
ROOF LEADER.
No. 550,032. Patented Nov. 19, 1895.
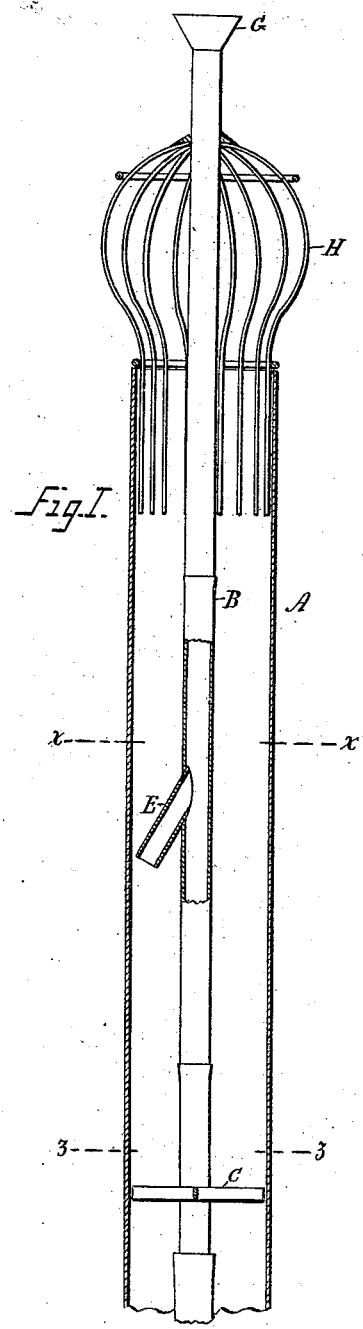
Fig. I.
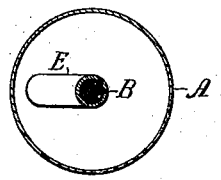
Fig. II.
Fig. III.
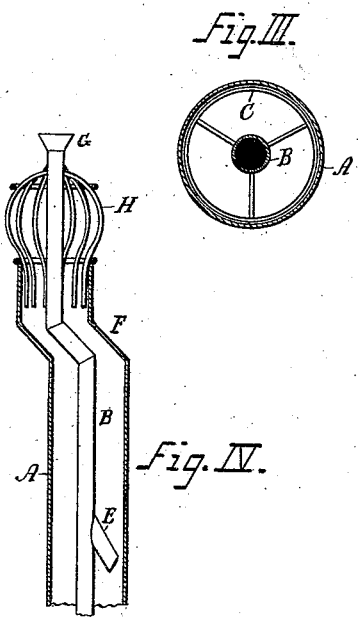
Fig. IV.
WITNESSES: 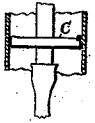
W. H. Constantine
Jas. S. Ewbank
INVENTOR
Robert C. Tucker
BY
Chas. Wahlers
ATTORNEY.

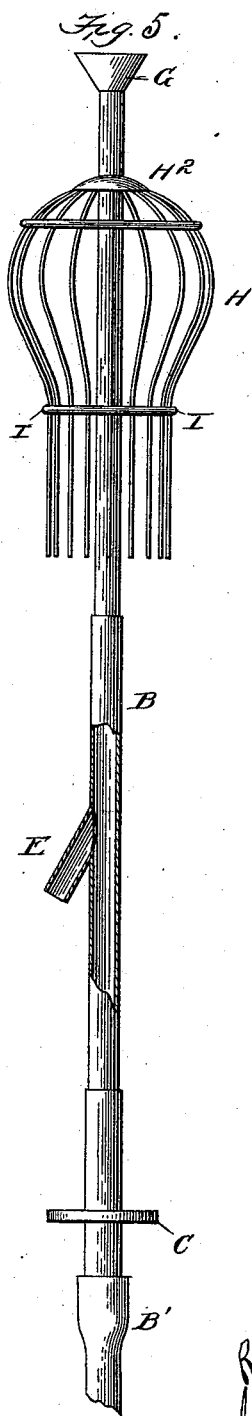

UNITED STATES PATENT OFFICE.

ROBERT C. TUCKER, OF NEW YORK, N. Y.

ROOF-LEADER.

SPECIFICATION forming part of Letters Patent No. 550,032, dated November 19, 1895.

Application filed November 19, 1894. Serial No. 529,309. (No model.)

*To all whom it may concern:*

Be it known that I, ROBERT C. TUCKER, a citizen of the United States, and a resident of New York, in the county of New York and State of New York, have invented certain new and useful Improvements in Roof-Leaders, of which the following is a specification.

It is well known that rain-spouts are liable and do overflow at the roof-gutter in heavy rains by reason of the air-pressure choking the leader-pipe just below its connection with the roof-gutter, and this air-pressure prevents the free entrance and descent of the water into and down the leader, and the consequent overflow of the water at the cornice and down upon the front wall, disfiguring it with dirt and discoloring matter. Such water-leaders also freeze up, so as to render them useless, and they burst from such freezing under the thawing action of the ice.

My improvements are directed to provisions whereby the leader is rendered free from air-pressure at and below its connection with the roof-gutter, and is thereby prevented from choking the water and overflowing at the entrance of the leader.

My improvement also embraces a novel provision whereby the leader can be freed from ice for the free discharge of the water from the roof. In effecting these objects I employ a device adapted to be inserted in and seated over the entrance of the leader and constituting in itself a strainer-cage for the roof-water and a ventilating-pipe for the leader, which also constitutes a conduit for hot water for freeing the leader from ice. For this purpose the upper part of this tube is of metal and constitutes a hanger for the lower part, which is of rubber, so that this pipe, having a length extending the whole length of the leader, can be inserted into the latter from the roof down into the sewer, conforming to whatever bends there may be in the leader. In these particulars my invention is illustrated in the accompanying drawings, and in connection with which I will particularly point out the precise features of construction and of combination which constitute my invention.

Referring to the drawings, Figure 1 represents a longitudinal section of a house water-leader pipe embodying my invention. Fig. 2 is a cross-section of the same taken on the line $x\ x$. Fig. 3 is a like section taken on the line $z\ z$. Fig. 4 shows a modification of the leader, and Fig. 5 shows in elevation the device embodying my invention removed from the leader.

A is the leader-pipe, which connects and opens into the roof-gutter in the usual way.

B is a comparatively small metal tube from a foot to eighteen inches in length, suspended and centrally maintained within and above the entrance of the leader by a wire strainer, cage H, which by a horizontal ring I is seated and rests upon the upper end of the leader, which opens into the bottom of the roof-gutter in a well-known way. This suspended tube B extends above the entrance of the leader, and the top of the cage is secured to said tube at $H^2$, so that the cage H incloses the central tube and the inlet of the leader and forms the strainer therefor. Preferably the lower end of the cage telescopes into the inlet end of the leader, and thereby serves to prevent the entrance of leaves and other matter from the roof into the leader, which would be liable to clog it, while such telescoping also serves to maintain the cage firmly seated within the leader and the central relation thereto of the ventilating-tube. The lower end of this tube is held and braced centrally within the leader by a spider C, fitting the inner walls of the leader. As shown, the cage is preferably made of wire, with the strands extending down below its ring-seat I, so that these strands can be sprung into the open end of the leader and form a lateral brace for the cage.

Above the seating-ring the cage can be enlarged in basket form.

Below the telescoping part of the cage its suspended tube is provided with a lateral branch tube E, whereby this suspended tube is made to communicate with the interior of the leader, and thereby prevent the air-cushion at the inlet of the leader, which, as stated, is the cause of choking the leader in the rush of the water to enter the leader. The ventilating-tube terminates in a funnel G above the cage, and it is apparent that by pouring hot water into this funnel it will pass down and heat this tube throughout its length, and thereby any ice that may be formed within the leader will be thawed out. The metal suspending part of the central tube is shown connected with the rubber section B' of said tube, the said connection being made by springing or forcing the rubber tube over the end of the metal tube.

In carrying out my invention I usually connect the central ventilating-pipe by its lower rubber section to the sewer-pipe of the building, while arranging the leader-pipe to discharge the water in the usual way from the roof-gutter.

In Fig. 1 the connection of the leader with the roof-gutter is by straight pipe and the central tube passes straight up through the leader; but to adapt the leader and its central tube to extend through the cornice to the roof-gutter the construction would be such as seen in Fig. 4.

The provision of the rubber tubular section of the central pipe gives the advantage of inserting the said pipe within the leader from the roof to the sewer; it gives the advantage of removing this central pipe by drawing it up from the roof-gutter; it gives the advantage of using and placing this central pipe in the water-leaders as now placed upon buildings; it gives the advantage of using a rigid cage-section within and above the mouth of the leader and a flexible section extending to the house-sewer, and it gives the advantage of quickly renewing the flexible tube-section at any time and for any cause and of using it in leaders having bends at any point in their length. The vent-pipe and the strainer-cage as a single device is adapted for use with water-leaders of any building.

I claim as my improvement—

1. A roof water leader pipe having a ventilating tube communicating therewith and fixed to and suspended by a strainer-cage seated upon the entrance of said leader, and a flexible tubular section connecting said ventilating tube with the house sewer.

2. A ventilating tube, for a roof water leader-pipe having a strainer cage fixed to it above the roof, and adapted to engage the inner walls of the leader to suspend and to brace said tube centrally therein, the said tube having also a spider engaging the interior walls of said leader and a lateral branch tube connecting said tube and leader-pipe between the strainer-cage and the spider.

3. The combination, with a roof water leader-pipe, of a tube within said leader-pipe, having fixed thereto a strainer-cage seated upon the entrance of said leader-pipe an air-ventilating branch-tube connecting said pipe and leader, a spider engaging the inner walls of the leader and a tubular rubber section connecting the ventilating tube with the house-sewer for the purpose stated.

4. The combination with a roof water-leader pipe, of a central tube extending from the roof to the house-sewer and having a ventilating branch opening into the leader below its inlet opening for the purpose stated.

ROBERT C. TUCKER.

Witnesses:
CHAS. WAHLERS,
CHARLES G. COE.